United States Patent [19]

Rosenblatt

[11] Patent Number: 5,554,659
[45] Date of Patent: Sep. 10, 1996

[54] INJECTION MOLDED PVA SPONGE

[76] Inventor: Solomon Rosenblatt, 127 W. 79th St., Apt. 11-C, New York, N.Y. 10024

[21] Appl. No.: 460,661

[22] Filed: Jun. 2, 1995

Related U.S. Application Data

[60] Division of Ser. No. 167,591, Dec. 14, 1993, which is a continuation-in-part of Ser. No. 979,260, Nov. 20, 1992, Pat. No. 5,276,993, which is a continuation of Ser. No. 740,942, Aug. 6, 1991, Pat. No. 5,170,580.

[51] Int. Cl.$^6$ ............................ C08J 9/30; C08J 9/34
[52] U.S. Cl. ................ 521/51; 521/65; 521/141; 521/905
[58] Field of Search ................ 521/141, 65, 905, 521/51

[56] References Cited

U.S. PATENT DOCUMENTS

| | | |
|---|---|---|
| 2,129,245 | 9/1938 | Stenstrom . |
| 2,609,347 | 9/1952 | Wilson . |
| 2,653,917 | 9/1953 | Hammon . |
| 2,664,366 | 12/1953 | Wilson . |
| 2,664,367 | 12/1953 | Wilson . |
| 2,797,519 | 7/1957 | Keller . |
| 2,846,407 | 8/1958 | Wilson . |
| 3,410,689 | 11/1968 | Nathan . |
| 3,663,470 | 5/1972 | Nishimura et al. . |
| 3,737,398 | 6/1973 | Yamaguchi . |
| 3,940,869 | 3/1976 | Roberts . |
| 3,953,934 | 5/1976 | Visser . |
| 3,958,357 | 5/1976 | Frank . |
| 4,083,906 | 4/1978 | Schindler et al. . |
| 4,098,728 | 7/1978 | Rosenblatt . |
| 4,463,018 | 7/1984 | Carr . |
| 4,553,966 | 11/1985 | Korteweg . |
| 4,736,542 | 4/1988 | Floyd . |
| 4,744,167 | 5/1988 | Steele . |
| 4,826,691 | 5/1989 | Prochnow . |
| 4,856,223 | 8/1989 | Evans . |
| 5,170,580 | 12/1992 | Rosenblatt . |

FOREIGN PATENT DOCUMENTS

| | | |
|---|---|---|
| 2499826 | 2/1981 | France . |

*Primary Examiner*—Morton Foelak
*Attorney, Agent, or Firm*—Ostrolenk, Faber, Gerb & Soffen, LLP

[57] ABSTRACT

A molded porous polyvinyl alcohol sponge includes an outer skin capable of absorbing and passing water to interior portions of the sponge, and is substantially smooth except for predetermined structural details imparted by the mold used in its making. The outer skin has smaller average pore size than does the interior portion of the product.

20 Claims, No Drawings

INJECTION MOLDED PVA SPONGE

RELATED APPLICATION

This application is a division of application Ser. No. 08/167,591, filed Dec. 14, 1993, which is in turn a Continuation-in-Part of U.S. application Ser. No. 07/979,260, filed Nov. 20, 1992, now U.S. Pat. No. 5,276,993, which is in turn a continuation of U.S. patent application Ser. No. 07/740,942 filed Aug. 6, 1991, now U.S. Pat. No. 5,170,580, the entire disclosure of which is incorporated by reference as though fully set forth herein.

BACKGROUND OF THE INVENTION

The present invention relates to injection moldable PVA sponge products and a process as for making such products.

Polyvinyl alcohol sponges (HPVA) usually have over 40 percent of their alcohol functions acetalized, and have a useful range of very desirable properties. They are open celled highly water absorbent porous flexible materials when moist, that wick aqueous solutions quickly. They are compressible when dry, expandable when wet, have high tensile strength, good elongation, and excellent resistance to most chemicals. They can be made bio-compatible, safe and therefore be non-toxic to the environment, and are exceptionally white in color. In some embodiments of the present invention, such sponges are more fully acetalized. These more fully acetalized sponges tend to become more rigid with reduced elongation. They are also more hydrophobic, very light in weight when dried, and thus, resemble Balsa or Cedar wood, except much stronger.

In the prior art, products derived from the less acetalized softer HVPA were mostly cut from blocks or large pieces, resulting in parts having some sharp corners and non-rounded dimensions. Also, the surface of these cut parts consisted of varying cross sections of pores, and therefore, were relatively rough on the outer surface because of the exposed pore edges.

The prior art relative to polyvinyl alcohol open cell foams (HPVA foams) describes processes that produce the material in large buns or blocks by pouring the foamed uncured resin into containers or other forms that produce large blocks. After these blocks are cured, sheets or pieces are derived therefrom by cutting and stamping processes. Both the cut surfaces and the core material have identical pore size. The cut surface, however, tends to be somewhat rougher due to the cross-sectioning of the pores, but the appearance is the same.

The surfaces of the cured large blocks of HPVA foam that are in contact with the curing container have surface skins with a different appearance than the core material. These surface skins are mostly discarded because the surfaces have a different appearance and texture from the rest of the sponge and were thought to be a nonporous skin which would inhibit water absorption.

It has been found, in accordance with the present invention, that these skins are quite able to absorb water. It has been found that they consist of a porous membranous skin. These skins conform to the interface of the curing container and the foamed resin. This skin appears nonporous because of its smooth surface. The surface also appears microscaled because it consists of much smaller pores than the core material. On further investigation, however, it was determined that the skin was surprisingly still porous. These smaller open pored smooth surfaced sponges may therefore fulfill the need for improved wound release non-abrasiveness or receiving printing or decorating without compromising the absorption functionality of the sponge body, and these surprising characteristics are utilized by the present invention.

HPVA sponges produced by the prior art for medical packing and protective applications are cut from blocks, and therefore, cannot faithfully fit the rounded contours of a body cavity since the body has no sharp corners. These sponges also have relatively rough textured surfaces into which tissue ingrowth can occur and be abrasive to delicate tissue, e.g. the surface of the brain. Adherence of tissue causes difficulty in removal, this being especially important in surgical packings. To overcome the tissue adherence problem in prior art HPVA sponges, ointments such as petroleum jelly, are coated onto the packing surface, but these ointments reduce absorption and can produce foreign body reactions, e.g. myospherulosis infections. Smaller pore cut HPVA sponges may produce less adherence, but their increased density necessary to produce the smaller pores reduces softness, and liquid holding capacity. The present invention overcomes these problems without necessitating ointments.

Another use for the novel molded HPVA products of the present invention is as a toy. Prior art toys made of other sponge materials, e.g. absorbent cellulose or open cell urethane sponges, do not have much physical or color detail resemblance to the natural model they represent and suffers because they are relatively crude in design, possess a rough or somewhat sealed surface. Therefore, they cannot receive good decorating detail or absorb enough water. The HPVA sponge of this invention, however, has a surface that permits faithfully detailed decoration and physical appearance detail, e.g., replicating water fowl or other animals. The result is a uniquely attractive and safe bath or play toy. The products of this invention are also odor-free, non-toxic, strong and functional as a true bath sponge.

A further use for the molded PVA sponge of the invention is as a fishing lure. HPVA polymer low density sponge lures have a unique advantage over the prior art soft lures by having more life-like action in the water due to their high flexibility, and high water content. These lures also have relatively high strength to give improved tear resistance on the hook, and a close to neutral buoyancy so that it neither sinks nor floats on the water, but remains substantially suspended within the body of water. The prior art soft lures which all tend to sink are mostly made of highly plasticized polyvinyl chloride which is heavier than water. They are also relatively weak which can cause propagation of a tear around the hook, and loss of the lure.

The smooth hydrophilic surface of the HPVA sponge fishing lure of the invention more resembles natural bait than the solid greasy plasticized polyvinyl chloride soft lures of the prior art because it has an appearance and feel of a moist smooth slippery surfaced live bait skin membrane. This is because of the HPVA sponge fishing lures' 80–90% open or connected pore volume which when filled with water causes it to float and move naturally, e.g. live baits are also mostly water. The high internal pore volume of the sponge lure also enables the incorporation of large amounts of fish attractants within the voids of the cells of the porous body which will better resist washing out and thus last longer in the water when compared to the small amounts of topically applied fish attractants now used with the prior art lures. The attractants do not wash out easily from the molded HPVA sponge lure because they are entrained homogeneously throughout all the interstitial small pore spaces of the sponge body.

Other benefits of a molded HPVA lure as compared to present vinyl lures are improved strength and longevity with longer hold time by the fish due to the softness and taste of the impregnated sponge thus allowing the fisherman more time to set the hook. HPVA molded sponge lures are environmentally safe, and can be dyed and decorated easily with brilliant colors. They have indefinite shelf life, are odor free until impregnated with fish attractant, and cannot be dislodged easily by the fish as the fine teeth of the fish tend to get entangled in the soft porous surface of the lure.

The prior art processes for making PVA sponge differs from the present invention. Most prior art processes warm the premix to make PVA foam sponges. One reason for preheating is to partially polymerize the resin mix to obtain a viscous more stable foam which stabilizes the pore size.

Another objective for warming the premix is to form blocks of HPVA with minimum shrinkage or collapse of the cured foam and thereby obtain reasonable curing times of 12–24 hours. Prior art processes discloses mixing and pouring resins at 110°–125° F. followed by about 16 hours cure time. If greater heat is utilized in the premix stage to obtain faster cures, the resin would cure in the mixing pot before it could be poured. In much of the prior art, the 110°–125° F. mixing range was found to be a practical range to effect cures within about 16 hours commensurate with acceptable shrinkage of the cured block. The temperature and state of the premix was important for some products whose pore size was critical. Therefore the in situ trapped heat is necessary to also final cure the homogenous foamed resin homogenous throughout because when pouring into a container an air entraining resin mix it becomes an insulating body, thus preventing additional externally applied heat from easily penetrating quickly and uniformly throughout the core of the block. If high temperatures were subsequently used to drive the heat more quickly in from the outside of the mold into the foamed resin interior to raise the temperature and thereby effect faster cures, e.g. containers placed in a hot oven, the surface of the resin in contact with the mold would soon deteriorate before the heat could travel by conduction into the block. Deterioration of curing HPVA polymer occurs at high temperatures because the sulfuric acid at high temperature, if allowed to concentrate by evaporation of its water content, will tend to cause dehydration and carbonization of the resin resulting in undesirable darkening and physical property deterioration of the polymer.

A second reason for warming the premix in the prior art is to prevent the uncured air entrapping foam from collapsing once it is poured in the curing container due to the entrapped air prematurely escaping. The foam that is produced in this warm premixing environment soon begins to cure producing a more viscous or partially cured and therefore strengthened precured foam mix. Due to this initial curing, the foam is given greater internal strength and stability since the air now has less tendency to escape from the more viscous mix. Therefore there is less tendency for foam collapse in the curing container and the size of the block is maintained close to its original container volume producing more uniform pores. However, this warm mix process also sacrifices the working life of the resin mix. The warm foam is introduced into or poured almost immediately into its container because it is now curing and thickening rapidly. Some shrinkage away from the container does occur but mainly because the chemical reaction produces water as a by-product and the new water insoluble HPVA foam takes up less volume than the uncured premix.

The prior art utilization of heat while mixing to increase premix viscosity, to prevent foam collapse and loss of pore size uniformity, and pouring the resin when warm into the container to reduce shrinkage, causes decreasing pot life. This prior art procedure therefore cannot be used to make a long pot-lived mass production moldable type of HPVA resin formulation. The latter process of this invention also requires premixes with lower viscosity and long pot life thus having the ability to fill small cavities with detailed interstitial spaces which can duplicate, with fidelity, the surfaces of the mold. Whereas, the prior art teaches pouring a warm, thick, partially cured resin mix into room temperature containers, this invention teaches pouring a very flowable, relatively uncured cold resin mix into molds that are hot or will be soon heated.

The molded surface skin's properties of this invention differ from other resinous molded foam surfaces because other moldable plastic foams result in having skinned surfaces which are of a nonporous or impermeable nature, e.g. Polyvinyl chloride (PVC foam used in car seats and upholstery coverings). The surface of HPVA sponges was also found to reproduce with fidelity small imperfections of the container wall in which it was cured such as scratches or gouges. From these observations it was concluded that HPVA foam material is capable of being produced in molded parts with surface detail having porous relatively smooth surfaces that can still absorb and pass water into the interior of the sponge part and be capable of being decorated with colors. However, these desirable properties could not be achieved economically or mass produced by conventional HPVA technology. Thus, the prior art HPVA resin formulations and processes must be changed to achieve low viscosity and long working life foams and further to be adaptable to new molding processing techniques.

This invention seeks to overcome the disadvantages of the prior art to achieve smooth contoured surfaces by employing a process and formulas that mass produce HPVA sponge parts that have rounded dimensions and smooth porous surfaces while still retaining all of the desirable properties of the HPVA sponge polymer.

SUMMARY OF THE INVENTION

It is an object of the present invention to provide a polyvinyl alcohol sponge part having differentiated smooth porous surfaces capable of absorbing and passing water and capable of being mass produced in molded parts.

Another object of the present invention is to provide a process for making a polyvinyl alcohol sponge having porous surfaces capable of absorbing and passing water and being capable of being mass produced in molded parts.

Another object of this invention is to provide a molded product made of polyvinyl alcohol sponge comprising a soft wood like consistency with a porous differentiated surface and body capable of absorbing and passing water.

Another object of this invention is to provide a polyvinyl alcohol sponge comprising a soft HPVA molded body with a smooth porous surface capable of absorbing and passing water, medicinals, ink, fish attractants, cleansing agents, and cosmetics.

Other features and advantages of the present invention will become apparent from the following description of the invention.

In one aspect of the invention, a molded porous sponge product is provided comprising a polyvinyl alcohol matrix that is at least partially acetalized, said product having an outer surface capable of absorbing and passing water through to an interior portion of said product, said outer surface having smaller average pore size than said interior portion.

In another embodiment, a molded porous sponge is provided comprising a polyvinyl alcohol matrix that is at partially acetalized wherein at least 50 percent of the alcohol groups have undergone acetalization. In certain preferred embodiments, acetalization exceeds 60 percent. In other embodiments, acetalization exceeds 70 percent. In the latter instance, for example, the ratio of acetalized functions to unreacted alcohol groups is in excess of 7:3. In another embodiment, a process is provided for preparing an insert mold comprising molding an HPVA sponge around an air passage or pressuring device.

In another embodiment, a process is provided for preparing a hard PVA sponge from a soft PVA sponge comprising placing the soft PVA sponge in a post-curing solution consisting of a mineral acid and an aldehyde and heating for a time sufficient for further acetalization to harden the soft sponge. Sulfuric acid and formaldehyde may be used, for example. It is preferred that heating take place at at least 130° F. (e.g., 140° F.) for a time period of at least ten hours and preferably at least fifteen hours.

In another embodiment, a process is provided for making a sponge product having a polyvinyl alcohol matrix that is at least partially acetalized, said process comprising the steps of: (A) frothing a mixture of an aldehyde and aqueous polyvinyl alcohol in the presence of a mineral acid and a wetting agent until a foam having sufficient viscosity to resist escape of entrained air is formed; (B) inserting said foam into a mold; (C) heat curing said foam in said mold to form said product; and (D) opening said mold to release said product.

When acetalization exceeds about 50 percent, and especially as it exceeds 60 percent or even 70 percent, the product becomes harder and can develop a soft wood-like consistency.

One process for preparing the products of the invention entails slurrying PVA in cold water and then heating the mixture while stirring. The solution is then cooled. The solution is then poured into a rotary beater mixer in which a mineral acid such as sulfuric acid is added. The mixer is then turned on slowly incorporating the acid, and then a wetting agent is added. The mixer speed is increased to high speed and the solution is frothed to a creamy consistency or foam. An aldehyde (preferably formaldehyde) is then added to the foam and the solution is mixed at high speeds. The final temperature of the foam is preferably below about 80 degrees Fahrenheit. The foam is transferred to an injection cylinder having an inlet from a source of compressed air. The foam is caused to eject through an outlet tube from the injection cylinder to an inlet tube of a multi cavity acid resistant mold. After injecting the foam into the molds, the molds are heated and cured. The molds are then opened and the parts ejected.

Preferred wetting agents include both anionic and non-ionil wetting agents. Preferred types are nonionics and linear alkyl benzene sulfonates. Preferred wetting agents include but are not limited to Triton X-200, Triton X-100 (union Carbide) and the Pluronic Series (available from BASF). The preferred curing temperature is about 125° to 180° F. The preferred injection pressure is about 2–100 psi. The preferred curing time is about ½ to 4 hours.

DETAILED DESCRIPTION OF THE INVENTION

One embodiment of this invention concerns the use of moldable PVA sponges as medical sponge products. The HPVA sponge of this invention makes for a good surgical packing because it can fit the anatomy of the packed space faithfully and is absorbent to body fluids. The moldable sponge of this invention applies gentle pressure on the bleeding site to produce hemostasis without excess pressure points that can result in the necrosis of the tissues. It is also smooth and therefore non-abrading to the tissue. Its composition does not emit any toxic substance into the body cavities, and most important does not adhere to the tissue either from clotting blood or due to ingrowth of tissue into the sponge.

It is desirable to have an anatomically shaped, soft, highly absorbent non-adhering sponge with a smooth small pored skin. This invention overcomes the deficiency of the prior art by producing rounded, contoured anatomically shaped sponge packings that have small pored, smooth surfaces which can be made with a variety of softness or firmness properties. Examples of useful, fully rounded or contoured smooth packings are gynecological or hemorrhoidal post-operative applications, or nasal packings.

In accordance with this invention, it has been found that a combination of contoured sponge and suctioning device can be made in the shape of a concave shaped soft heart pillow liner. This device would elevate, thermally isolate, and cushion the heart during open heart surgery and simultaneously remove irrigating fluids by attachment of a suctioning line.

Another embodiment of this invention can be used for nasal packings. In certain packings such as in the anterior nasal cavity where the septum is relatively flat, only one side of the mold needs to be contoured. The contoured nasal mold cavity is filled with the sponge forming resin and a flat plate is placed on top to complete the mold. The cured finished part will now consist of a sponge with one flat surface to fit against the septum and an anatomically shaped contoured surface. Another use of a sponge with one flat surface and one contoured surface is as a fishing lure by casting foam into an open mold, and covering the exposed surface with a flat plate.

Posterior nasal packings of this invention that can reach down into the throat can be more perfectly matched in shape to the posterior nasal cavity so that all areas of the posterior nasal cavity are in contact with the hemostatic pressure of the sponge. Also, a silicone tube or a small inflatable balloon may be insert molded in one step into the nasal sponge to act as an air passage and/or a further pressuring device, eliminating the three-step process of the prior art of cutting the sponge, punching a hole to receive and then install the insert.

Additional embodiments of surgical or non-surgical contoured health care sponges for absorbent packing and tissue protective applications are catamenial tampons, cardioplegic blankets, neurological sponges, bandages and dressing for chronic ulcers. All of these applications will benefit from the smooth, non-adherent anatomically shaped soft absorbent sponges of this invention.

Another embodiment of this invention is the use of the molded PVA sponges for fishing lures. A molded smooth surfaced soft, very flexible sponge fishing lure can be made with faithful natural detail and colors, e.g. in the molded shape of a minnow, frog, worm, or flat leach. Naturally, many uses other than as a fish lure are contemplated and many are discussed herein.

Another embodiment of this invention is the use of the molded PVA sponges as toys. The highly absorbent HPVA sponge properties of this invention permits their use as a true bath sponge with very soft tactile and long lasting physical properties. Also, most importantly, since the HPVA sponge when dry is compressible and re-expandable to its original wet dimensions when remoistened, HPVA toys have the added attraction of originally being seen in their dry compressed state, e.g., a capsule, but quickly expand to more than ten times their dry volume when wet, e.g., a duck.

Another embodiment of this invention is the use of the molded PVA sponges as Gaskets or Seals. Gaskets and seals that require a special profile can be molded. Such hydrophilic HPVA gaskets are useful because they can expand into a joint to effect superior sealing and are compatible and impregnable with various water based cements to achieve a combination seal and permanent bond. An example of an HPVA hydrophilic seal would be a cement or ceramic pipe joint seal required when joining lengths.

Another embodiment of this invention is the use of molded PVA sponges as a Sponge roll for cleaning, printing and water absorption. Patterned or smooth sponge rolls useful for printing, applying water based fluids, washing processes, or picking up water based fluids, can be made using the HPVA processes of the present invention. A sponge roll can be molded to have a detailed surface design and/or protrusions or cavities molded into its surface. These HPVA rolls are very compatible with water based inks and address current environmental concerns about reduction of toxic organic solvents emitted from these inks. HPVA printing sponge rolls with a precisely molded surface will have good reproduction properties, be very durable and have high liquid holding capacity. Sponge roller mops for pushing and removing water from floors are a typical water removal application.

The above examples are only illustrative and are not to be considered limiting.

A prerequisite to the economical production of HPVA sponge small parts of this invention would be the desirability of having a resin mix with good flow properties thus capable of being injected through small orifices. The foamed resin of this invention is flowable through small spaces and grooves to replicate fine mold detail at relatively low injection pressures of 2–100 psi, and a preferred pressure of 2–50 psi, especially 5–50 psi, e.g., 15 psi. The sponge also has a working pot life of the resinous foam mix of a minimum of 30 minutes.

Low pressure injection is also economically desirable because HPVA precured resins are acidic and only certain stainless steels will withstand for a long time the corrosive action of the mix. These corrosive resistant stainless steels are expensive but are the only choice if high pressures are utilized. However, if a process can be designed to operate under low pressure, less stronger corrosive resistant materials than stainless steels can be used such as many plastics, e.g. polycarbonates, polypropylenes, polystyrenes, silicones, etc. These plastics will withstand the corrosive action of these HPVA resin mixes for a long time but cannot be used for very high temperature or pressure molding. Therefore, employing the relatively low temperature/low pressure molding techniques of this invention allows the use of economical plastics for the resin mix contacting surfaces in the injection molding machinery and most important also permits the use of inexpensive plastic molds for forming the parts.

The desirability for long pot life or working life comes from the need to have generous working time allowances for varying the process step intervals that may be required for manufacturing the different and many parts. There will be a varying time difference requirement between the production of the foam from the mixer which may coordinate with the molding rate which in turn depends on the number and type of parts being molded and the time to transfer the mix into the injection molding reservoir and the time it takes to deliver the mix from the injection molding reservoir to fill many mold cavities. What affects the molding rate is the number of molds and size of parts in each mold as smaller parts have smaller orifices which take longer to receive the foam.

In accordance with the invention, heat is externally supplied rather than incorporated in foam. With products of less than two inches in thickness, especially less than one inch, it is easy to provide ample heat throughout the product.

Good flowability allows for low injection pressures during the injection time and good filling rates into the finely detailed spaces in the mold, such as required for molding small narrow appendages to resemble a live bait, fish lure. This also enables the use of inexpensive plastic molds. The need for inexpensive plastic molds cannot be over emphasized because many molds will be required for high production volumes as curing time for these molded HPVA parts is in the preferred 0.5–4.0 hour cure time (more preferably 1–3 hours), sufficient time for about 40% of the alcohol groups to be acetalized by aldehyde. In those embodiments where a stiffer or wood-like consistency is desired, curing should continue until at least 50 percent, and preferable 60 to 80 percent (e.g., 70 percent) of the alcohol groups are acetalized at preferred temperatures of 125° to 200° F., more preferably 150°–185° F., e.g., 165° F. As is well known in the art, temperature varies inversely with curing time. Heat capacity of the molds, and number of molds being heated, are other variables. It is preferred in practicing the present invention, that the molds be cured in an oven such as a steam chamber. In contrast, most other injection moldable plastics in the prior art, such as highly plasticized polyvinyl chloride resins used for soft fishing lures, do not undergo a chemical reaction in order to cure but simply by cooling from its molten state, gel into a finished part. The cooling or curing cycle in conventional injection molding parts is further accelerated to three minutes or less by having the metal molds cooled with a coolant fluid which is circulated through the metallic jacket of the mold. These fast molding cycles often require only one or a few molds. The melt viscosity even at 300°–400° F. of many injection moldable resins is such that often thousands of pounds of pressure are required to push the viscous resins into the multi cavities of the high pressure clamped mold and therefore both the injection molding barrels and molds are made of strong metals. However, this invention utilizes the concept of injection molding only insofar as to form a shape by filling a cavity of that shape, but in other respects is different from conventional injection molding in that as described above much lower temperatures of 40°–85° F. and injection pressures of 2–100 psi, and preferred 2 to 50 psi, are utilized. The lower the temperature the longer the pot life, and the more molds which can be injected.

The prior art depends on the thickening of the premix created by warm mixing to obtain pore size stability, or it cool mixing simply allows some collapse of adjacent air cells creating a non-uniform pore size distribution. In contrast the present invention selects certain wetting agents, e.g. amphoteric anionics, linear alkyl aryl sulfonates, certain nonionics and foams at cool temperatures, e.g. 85° F. or less. The combination yields a thick creamy aerosol like soapy foam. This foam has sufficient stability to prevent breakage or collapse of the air bubbles during the injection period. Thus, this invention provides for maintaining a small uniform relatively stable foam with long enough pot life to maintain pore stability without preheating. A uniform pore size is desirable especially in small detailed molded parts because a large void could be a weak point in the product or otherwise cause imperfection on the surface which would cause a decorating or anatomical defect.

To minimize the problem of shrinkage in this invention, the entrained air is further utilized by having it expand the surrounding yet uncured and mobile resin in which it is entrained. This occurs when the relatively cool uncured resin contained in the mold is then heated in the mold causing the air entrained in the mix to expand at the same time that the resin is undergoing curing. The cavity of the mold is thus kept filled with foam during the curing process because the foam is pushed slightly against the walls of the cavity by the heated expanding air producing good mold surface detail. Only after the impression and curing is completed does the molded part shrink slightly away from the mold. However, this shrinking is helpful as it facilitates easy removal of the parts from the mold cavities.

The following is a summary of additional process and product benefits derived from this invention:

1. Good flowability of the resin mix over the injection period allows the filling of narrow passages in the mold at low injection pressures and permits producing fine detail in the product.

2. Faster cures of small parts are achieved at 120°–200° F. in ½–4 hours because of faster penetration of the heat through the much thinner mold cross sections as opposed to 15–24 hour cures for prior art larger blocks. Also the sealed molds have less tendency to allow dehydration of the sulfuric acid which causes an attack of the resin, thus allowing higher curing temperatures.

3. Resin components are handled, mixed and injected at room temperature or below requiring no additional steps of preheating of resin before molding.

4. Resin component solutions contain pungent aldehyde curing agents whose volatility and odor increases with temperature. Working with cool resins compared to warm resin reduces the volatility and irritability from the vapors that come off aldehyde containing mixes.

5. Low temperatures give longer pot life and more latitude in process conditions.

6. The entrained air in the precured resin foam expands in the mold during the initial introduction of heat in the curing oven permitting more reliable filling of the cavity and resulting in less rejected parts.

7. Inexpensive plastic molds can be used.

The following examples show how to obtain resin mixes with good flowability at room temperature while still maintaining good foam stability and long pot life.

EXAMPLE 1

Use of Additions of High Foaming Wetting Agent Concentrations Plus Starch As A Foam Stabilizer 20 grams of medium Mol weight (molecular weight yielding 27–33 centipoise viscosity when dissolved to make 4% aqueous solution at 20° C.) fully hydrolyzed polyvinyl alcohol, and 10 grams of corn starch was slurried in 180 ccs of cold water and heated while stirring to 195° F. The resulting solution was cooled to about 60° F. The resin solution was poured into a mixer with rotary beaters and 32 cc. of 36% sulfuric acid at about 60° F. was added. The beaters were turned on slowly to incorporate the acid and then 13 grams of Triton-X 200 wetting agent was added. The beaters were then increased to high speed and the resin was frothed to a creamy consistency until 50 cc of foam weighed 37 grams. 24 ccs. of 37% formaldehyde at about 60° F. was then added to the froth and mixed at high speeds for one minute more. The final temperature of the mix was about 65° F. The mix was then transferred to a 500 cc. injector cylinder fitted with a piston and an inlet from a source of compressed air and an outlet tube whose inlet is under the resin mix with its outlet having a plastic tapered fitting end that fits into the inlet orifice of the plastic mold. The air pressure in the cylinder was increased slowly up to 15 psi, and the foam was ejected through the outlet tube into the inlet of a multi cavity two-piece plastic mold some of whose cavities resemble a minnow and other cavities resembling a small grub. After injecting the resin over a 30 minute period, filling many plastic molds, the molds were continuously placed in a steam box at 165° F. and cured for 65 minutes. The molds were then opened in a ventilated chamber and the cured sponge fishing lure parts were ejected from the mold and placed in a container containing a solution of sodium bicarbonate and ammonium hydroxide and washed to neutralize the residual acid and formaldehyde. The final wash water was at a pH of 6.5 with no residual odor. The molded sponge replicas of the minnows and grubs showed good mold detail, smoothness, and porosity of the surface skin and had excellent water absorption properties. The HPVA sponge polymer had the strength, elongation, and flexibility characteristics typical of such foams. The lures were dyed while still in the moist state by vat dyeing techniques similar to those used with cotton fabrics. The fresh water lures were impregnated with salt water or other fish attractant and packed moist into sealable polyethylene pouches.

EXAMPLE 2

Use of Thermally Reversible Gelling Agents

Aqueous solutions of certain cellulose ethers will gel or thicken when heated to 120°–140° F. These gels have relatively low viscosities at room temperatures but exhibit bulk gelation properties when heated to moderately high temperatures. Therefore, these cellulose ethers will allow the necessary good flow properties at low injection pressure conditions at room temperature. Once the resin mix is introduced into the mold and heated, however, the mix will then gel producing a higher viscosity precured resin mix thus having a stabilizing effect on the air entrainment properties of the resin mix. Use of these gelling agents therefore generally reduces the amount of wetting, foaming or stabilizing agents required while producing the desired foam stability with elimination of the starch. Example 1 is repeated except that an addition of 4 grams of a hydroxy propyl cellulose ether powder is introduced into the polyvinyl alcohol solution at 195° F. instead of the starch and slurried into the hot resin solution while the solution is being stirred and cooled down to room temperature. A linear alkyl benzene sulfonate with 12 carbons in the alkyl chain wetting agent is reduced to 8 grams but in all other respects the same processes are carried out as in Example 1. The sponge parts produced had a somewhat smoother surface than those in Example 1 and had excellent porosity. The polymer had all the desirable physical characteristics of HPVA foams.

EXAMPLE 3

Example 1 was repeated, without the starch addition but using 20 grams of high Mol weight more viscous polyvinyl alcohol resin, e.g., a resin having a viscosity (in 4% aqueous solution) of over 55 centipoise at 20° C. The resin mix was beat to a creamy foam in a mixer with a rotary beater. Other types of mixers suitable include but are not limited to Mondo Mixer, Ika, Trefa, Oaks and Goodway. The thick foam peaked like a cooled whipped cream mix and was immobile when the mixer bowl was tipped. The creamy mix was ladled into an injector and pushed with a fitted piston at about 15 psi air pressure into molds. The foam flowed easily in front of the piston and flowed out at low pressure into the smaller cavities of the mold. After curing the mold in a steam box for 60 minutes at 170° F. the cured parts were ejected from the mold, neutralized, and washed with a basic hydrogen peroxide solution. Cross-sectioning of the molded sponge indicated good pore uniformity and an excellent surface finish. This example illustrated that with an appropriate wetting agent and resin viscosity, cool temperatures and high speed mixing one can obtain uniform pore size stability similar to that obtained by prepolymerization of warm resins as described in the prior art. The sponge products produced had the typical high quality physical properties of uniform pore size HPVA sponge.

Viscosity and pot life of the resin prior to injection can be controlled by varying temperature. The viscosity appropriate to a given process will vary by the number of molds to be filled, size of passageways to mold cavities and intricacy of product structure. Intricate design or narrow pathways lower viscosity and lower temperature. Lower temperature, and thus longer pot life, is best for a high number of molds.

EXAMPLE 4

To Make a More Rigid or Stiffer Fish Lure Resembling Light Wood Based Hard Fish Lures Example 1 is repeated except that 30 cc of 37% formaldehyde are added and the molds are cured at 140° F. for 12–24 hours in an air circulating oven. After curing and opening the molds, the washed HPVA parts when compressed by hand were stiffer and less flexible than the parts made in Example 1. The parts were thoroughly washed while immersed in a circulating water bath containing 10% sodium bicarbonate and hydrogen peroxide while automatically maintaining a pH of 9, and thereby washed free of formaldehyde and acid. The parts were then dried for 16 hours at 125° F. The dried parts were light in weight, smooth surfaced and resembled a finely sanded white balsa wood-like carved shape suitable for a lightweight hard lure body. This example demonstrates that the sponge part can be cured to form a hard wood like body by reacting with more curing agent over a longer period of time. The resulting fishing lure resembled in appearance, weight and stiffness a soft wood based fishing lure. Example 4 also demonstrated that a wood-like property can be obtained with this PVA molding process without the numerous machining operations required in the prior art to make real wood lures.

Some hard lures may benefit from having soft flexible appendages, e.g. a segmented skirt formed from many flat or round foam strips surrounding a part of the soft lure. To produce a combination of hard and soft properties in one entity, the lure may be cured to a soft consistency and then the portion of the lure that is to be made hard is immersed in a post-curing solution consisting of 30 parts of 50% sulfuric acid and 25 parts of 37% formaldehyde at 140° F. for 15 hours. To prevent the post curing solution from flowing by capillary action into the soft skirt component a ring clamp is placed at the point where the skirt joins the hard lure body.

Alternatively, a soft flexible HPVA skirt can be added to a hard lure body by die cutting the skirt from soft HPVA sheet material and attaching the skirt by any of the methods commonly used to bond plastics to each other, e.g. adhesives, heat welding, ultrasonic welding, etc. Also a flat, soft, HPVA appendage can be attached to the hook to act as a trailer.

The above examples illustrate the use of the process for producing fish lures, however when the sponge of the present invention is used for medical purposes, the wetting agent must be washed out completely. To test whether the wetting agent is washed out completely, the bubble test from the Rosenblatt patent, 4,098,728, must show zero bubbles. A biocompatible wetting agent may then be post-impregnated into the sponge to achieve the ten second bubble test result.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An individually molded porous sponge product comprising a polyvinyl alcohol matrix that is at least partially acetalized, said product having an open celled outer skin capable of absorbing and passing water through to an interior portion of said product, said outer skin having smaller average pore size than said interior portion and wherein said outer skin substantially uniformly covers said inner portion and wherein said outer skin is formed by forcing a foam material to contact a surface of a mold.

2. The molded porous sponge of claim 1, wherein said polyvinyl alcohol matrix is at least partially acetalized wherein at least 50% of the alcohol groups have undergone acetalization.

3. The molded product of claim 1, wherein said molded product has at least one flat surface.

4. The molded product of claim 1, wherein said product is shaped as a fishing lure.

5. The molded product of claim 1, wherein said molded product is shaped as a gasket.

6. The molded product of claim 1, wherein the molded product is shaped as a medical or surgical sponge.

7. The molded product of claim 1, wherein the molded product is shaped as a Sponge roll.

8. The molded product of claim 1, wherein the molded product is a cup-shaped heart pillow liner for use on a heart pillow for elevating the heart during open heart surgery.

9. The molded product of claim 1, wherein said product is shaped as a nasal packing.

10. A molded polyvinyl alcohol sponge product obtained by the process of:
    frothing a mixture of an aldehyde, aqueous polyvinyl alcohol and a mineral acid, with the proviso that if said frothing occurs approximately at or below ambient temperature then said polyvinyl alcohol includes a high molecular weight polyvinyl alcohol or a compound selected from the group consisting of a wetting agent, a thickening agent and a mixture thereof is included and wherein said frothing step is performed until a foam having sufficient viscosity to resist escape of entrained air is formed;
    inserting said foam into a vented mold;

heating said mold containing said foam thereby forcing said foam against an inner surface of said mold and thereby forming an open celled outer skin on said sponge product and wherein said outer skin has a smaller average pore size relative to an interior portion of said sponge product; and releasing said product from said mold.

11. The molded product of claim 10, having a soft wood-like consistency with a porous surface capable of absorbing and passing water into an interior portion of said product, said surface having smaller average pore size than said interior portion.

12. The product of claim 1, wherein said surface is substantially smoother other than having predetermined structural details imparted by a mold used in formation of said product.

13. A molded porous sponge product according to claim 1 wherein said product is injection molded.

14. A molded porous sponge product according to claim 13 wherein said product is injected molded at a pressure between approximately 2–100 psi.

15. A molded polyvinyl alcohol sponge product according to claim 10 wherein said foam is inserted into said mold by injection.

16. A molded polyvinyl alcohol sponge product according to claim 15 wherein the injection pressure is between approximately 2–100 psi.

17. A molded sponge product according to claim 1 further comprising a device positioned therein.

18. A molded sponge product according to claim 17 wherein said device is selected from the group consisting of an air passage device and a pressuring device.

19. A molded sponge product according to claim 10 further comprising the step of:

inserting a device into said vented mold prior to said step of inserting said foam into said vented mold.

20. A molded sponge product according to claim 19 wherein said device is selected from the group consisting of an air passage device and a pressuring device.

* * * * *